United States Patent [19]
Reggin et al.

[11] Patent Number: 5,316,105
[45] Date of Patent: May 31, 1994

[54] PORTABLE TREE STAND FOR DEER HUNTING

[76] Inventors: Robert F. Reggin, 10751 Ahern Ave., Watertown, Minn. 55388; Michael F. Zamzow, 4198 Northshore Dr., Mound, Minn. 55364

[21] Appl. No.: 25,927

[22] Filed: Mar. 3, 1993

[51] Int. Cl.$^5$ .................................. A01M 31/02
[52] U.S. Cl. ................................ 182/187; 182/188
[58] Field of Search .......... 812/187, 188, 116, 133-136

[56] References Cited

U.S. PATENT DOCUMENTS

| | | | |
|---|---|---|---|
| D. 270,474 | 9/1983 | Haines et al. | D25/62 |
| 2,375,685 | 5/1945 | Pennington | 304/28 |
| 3,368,725 | 2/1968 | Martin | 182/187 X |
| 3,392,802 | 7/1968 | Moore | 182/187 |
| 3,419,108 | 12/1968 | Mobbs | 182/187 X |
| 3,854,551 | 12/1974 | Lindow | 182/187 |
| 4,009,763 | 3/1977 | Hunter | 182/187 |
| 4,124,094 | 11/1978 | Cande | 182/187 |
| 4,129,198 | 12/1978 | Hunter | 182/187 |
| 4,236,602 | 12/1980 | Leggett | 182/187 |
| 4,411,335 | 10/1983 | Forrester | 182/187 X |
| 4,549,635 | 10/1985 | Early | 182/187 |
| 4,600,082 | 7/1986 | Rauls | 182/187 |
| 4,667,773 | 5/1987 | Davis | 182/187 |
| 4,721,183 | 1/1988 | Koniecka | 182/182 |
| 4,730,699 | 3/1988 | Threlkeld | 182/187 |
| 4,782,918 | 11/1988 | Brunner et al. | 182/187 |
| 4,784,972 | 11/1988 | Kirkman | 182/187 |
| 4,987,972 | 1/1991 | Helms | 182/187 |
| 5,105,910 | 4/1992 | Engstrom | 182/187 |

Primary Examiner—Alvin C. Chin-Shue
Attorney, Agent, or Firm—Kinney & Lange

[57] ABSTRACT

A portable tree stand assembly includes a horizontal platform, which is easily mountable to a trunk of a tree. A vertical mounting structure is connected to a rear side of the horizontal platform and extends vertically downward from the horizontal platform. A cantilevered support structure is connected between a front side of the horizontal platform and a base of the vertical mounting structure, which allows an upper surface of the horizontal platform to be unobstructed. A plurality of spurs protruding rearwardly from the vertical mounting structure grip the surface of a tree without causing substantial damage to the tree. A link chain secures the stand to the tree without requiring cinching or tightening.

9 Claims, 8 Drawing Sheets

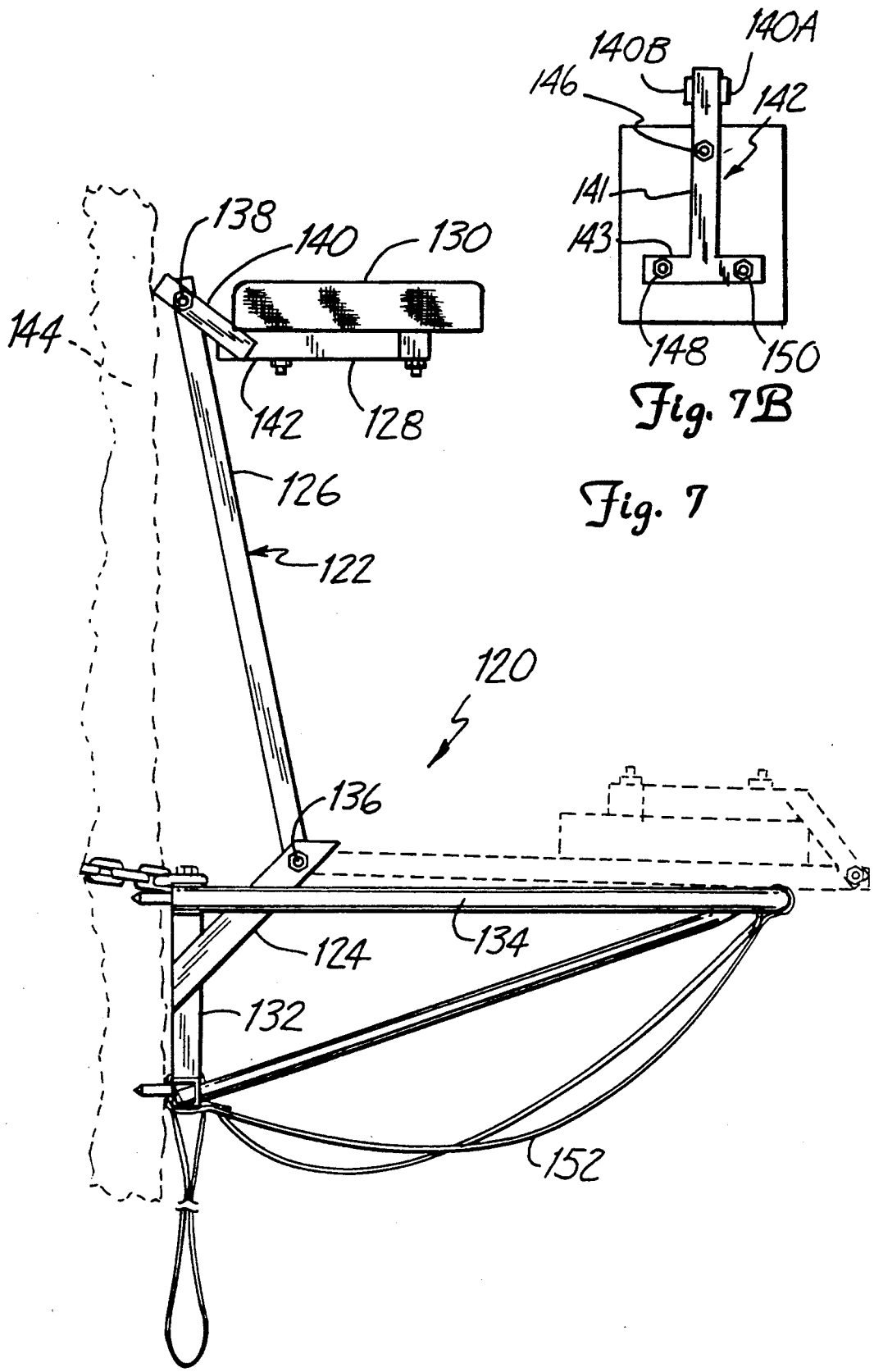

PORTABLE TREE STAND FOR DEER HUNTING

BACKGROUND OF THE INVENTION

The present invention relates to a tree stand, commonly used for deer hunting. In particular, the present invention relates to a tree stand of the type that is packed into the woods, attached to a tree, and on which a hunter can stand while waiting for game to approach.

It is known to provide a tree stand assembly wherein a horizontal platform is supported on the tree trunk by gripping means which may extend integrally downwardly from a back end portion of the platform. Such a platform can be held against the tree trunk by hooking one link of a chain to one side of the back portion of the platform and another link of the same chain to the other side of the platform. Such a platform can be kept from slipping down the tree by providing large spikes at the bottom of the gripping means and driving those spikes into the tree trunk. See U.S. Design Pat. 306,348 granted to Baumeister on Feb. 27, 1990.

A deficiency of such prior art devices has been the necessity of pounding large spikes into the tree trunk to the detriment of the tree. Other stands have been developed which rely on actually screwing the stand into the tree at the top edge of the platform, and then either screwing a portion of the gripping means into the tree or pounding spikes on the bottom ends of the gripping means into the tree.

Such prior art devices are often made of iron or steel and are, consequently, heavy to carry into the woods and are even more difficult to carry out of the woods if the hunter is successful and has to also transport a deer or other large game animal out at the same time.

It is also known to provide portable deer stands which are built up on the spot by assembling metallic bars. These are inconvenient and, perhaps worse, the inevitability or possibility of the clash of metal on metal can do much to deter game animals from frequenting their regular trails along which the hunter is deploying a tree stand or other deer stand.

There is a need therefore for a tree stand assembly which could be easily carried into the woods and out of the woods again as a back pack. For a lightweight, easily mountable tree stand, which is capable of providing a sturdy, stable horizontal platform with minimal damage to the tree.

SUMMARY OF THE INVENTION

A tree stand assembly includes a platform and a means for connecting the platform to a trunk of a tree. The platform includes a rear side which is positionable adjacent to the tree, a front side opposite the rear side, a right side and a left side, which connect the front and rear sides and a supporting surface. A support member is connected to the rear side of the platform and extends in a transverse direction opposite the supporting surface. A plurality of spurs extend rearwardly from the rear side of the platform and the support member. Means connectable to the platform are capable of encircling the tree trunk to hold the platform and the plurality of spurs against the tree trunk.

To mount the tree stand assembly to the tree, the platform is placed adjacent to the tree, with the front side oriented upward and the rear side oriented downward. The encircling means is then wrapped around the circumference of the tree and connected to the platform near the right and the left side of the platform. The front side of the platform is then rotated away from the tree about an axis defined by the rear side of the platform, until the plurality of spurs grip a surface of the tree.

BRIEF DESCRIPTION OF THE DRAWINGS

FIG. 7 is a side view of a third embodiment of the tree assembly of the present invention.

FIG. 7B is an enlarged bottom view of the seat support of FIG. 7.

DETAILED DESCRIPTION OF THE PREFERRED EMBODIMENTS

Figure 1:
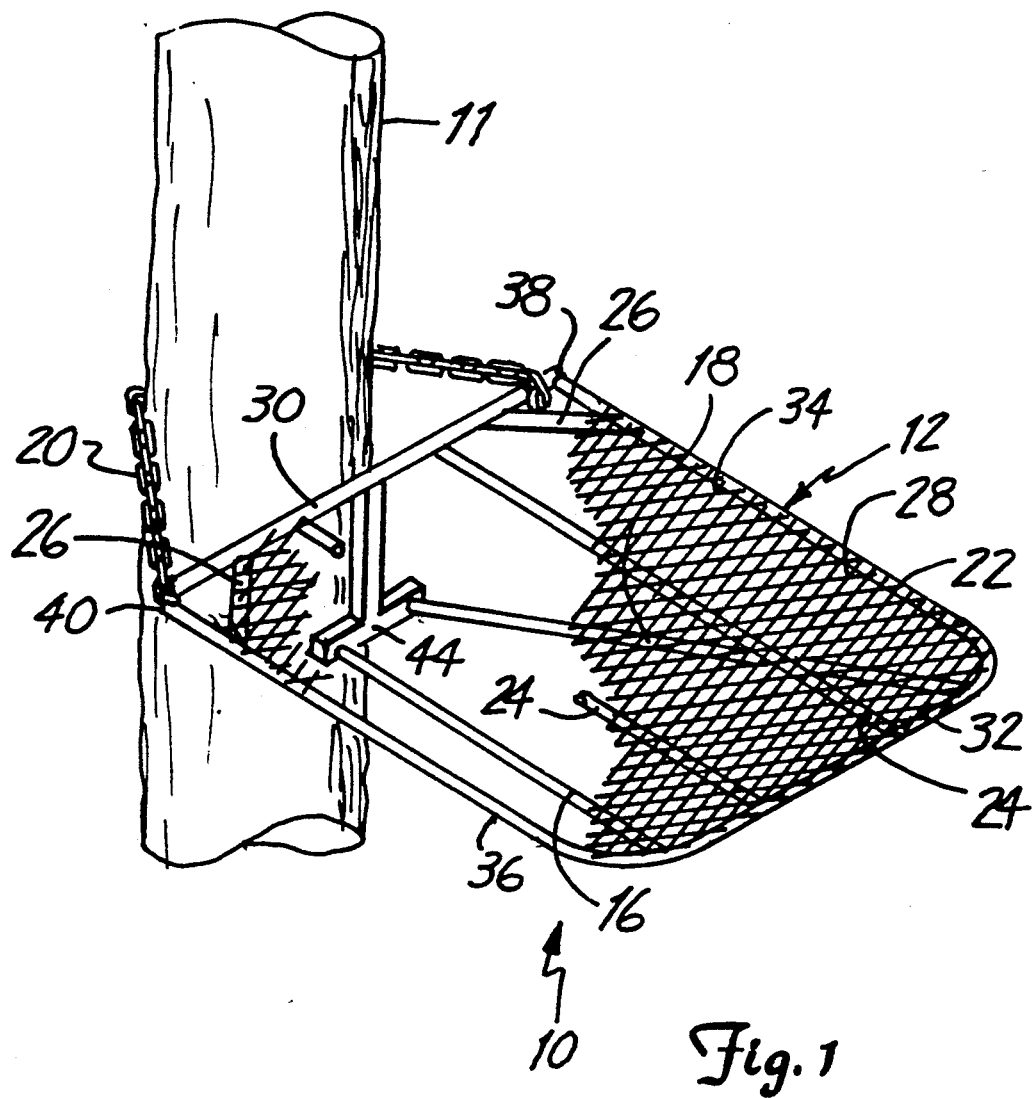
FIG. 1 is a perspective view of a tree stand assembly of the present invention.

FIG. 1 shows tree stand assembly 10, mounted to tree 11. Tree stand assembly 10 generally includes horizontal platform 12, vertical mounting structure 14, cantilevered beams 16 and 18 and link chain 20.

Platform 12 includes frame 22, support members 24, corner supports 26 and floor 28. Frame 22 is defined by rear side 30, front side 32, left side 34 and right side 36, as viewed in FIG. 1. Sides 32, 34 and 36 are preferably formed from a single cylindrical metal tube, such as carbon steel, while rear side 30 is preferably formed from a length of squared tubing of carbon steel. Ends 38 and 40 of left side 34 and right side 36, respectively, are secured to rear side 30 by welding.

Support members 24 are connected between rear side 30 and front side 32. Support members 24 are generally spaced equidistant from the center of platform 12. Support members 24 are formed from cylindrical carbon steel tubing, similar to that used for sides 32, 34 and 36. Support members 24 increase the structural integrity of frame 20 and provide a support surface for floor 28.

Corner supports 26 are connected between side 34 and rear side 30, and side 36 and rear side 30, respectively, near ends 38 and 40. Corner supports 26 which are preferably connected by welding, provide additional support to the connection of sides 34 and 36 with rear side 30. In addition, corner supports 26 provide a support surface for connecting floor 28. Corner supports are preferably formed from strips of a flat metal, such as carbon steel.

Floor 28, which has been partially cut away to simplify description of tree stand assembly 10, is connected to frame 20, support members 24 and corner supports 2 6. Floor 28 is preferably a steel grate, which provides a support surface for a stand user while providing a view below platform 12. In addition, the steel grate eliminates the accumulation of snow when tree stand assembly 10 is used in cold weather climate and provides a no-slip surface for a user of tree stand assembly 10.

Vertical mounting structure 14 includes vertical member 42 and horizontal member 44. Vertical member 42 extends vertically downward from rear side 30 and horizontal member 44 is attached to the lower end of vertical member 42 to provide a support structure below platform 12 for connection to cantilevered beams 16 and 18.

Cantilevered beams 16 and 18 are connected between front side 32 and horizontal member 44 to provide cantilevered support for platform 12 when tree stand assembly 10 is secured to tree 11. In this manner, a user of tree stand assembly 10 has an unobstructed range of movement when standing on floor 28 of platform 12.

Link chain 20 is connectable to rear side 30 near right side 36 and left side 34 and provides a means for connecting tree stand assembly 10 to tree 11 without the need for cinching link chain 20 once it is connected to rear side 30.

Figure 2A:
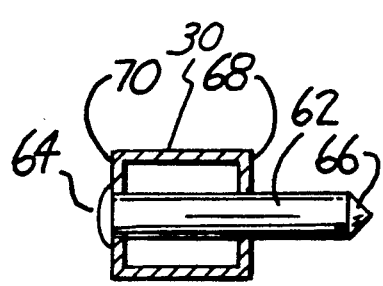
FIG. 2A is a cross-sectional view taken along line 2A—2A of FIG. 2.
Figure 2B:
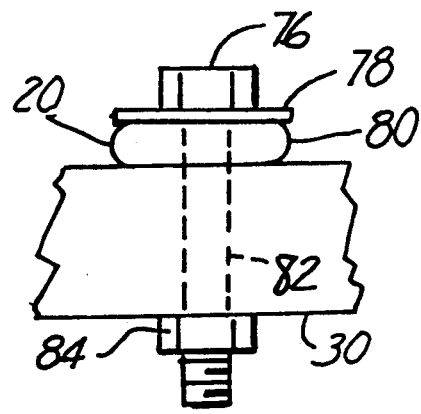
FIG. 2B is an enlarged side view of the chain/platform connection of FIG. 2.
Figure 2:
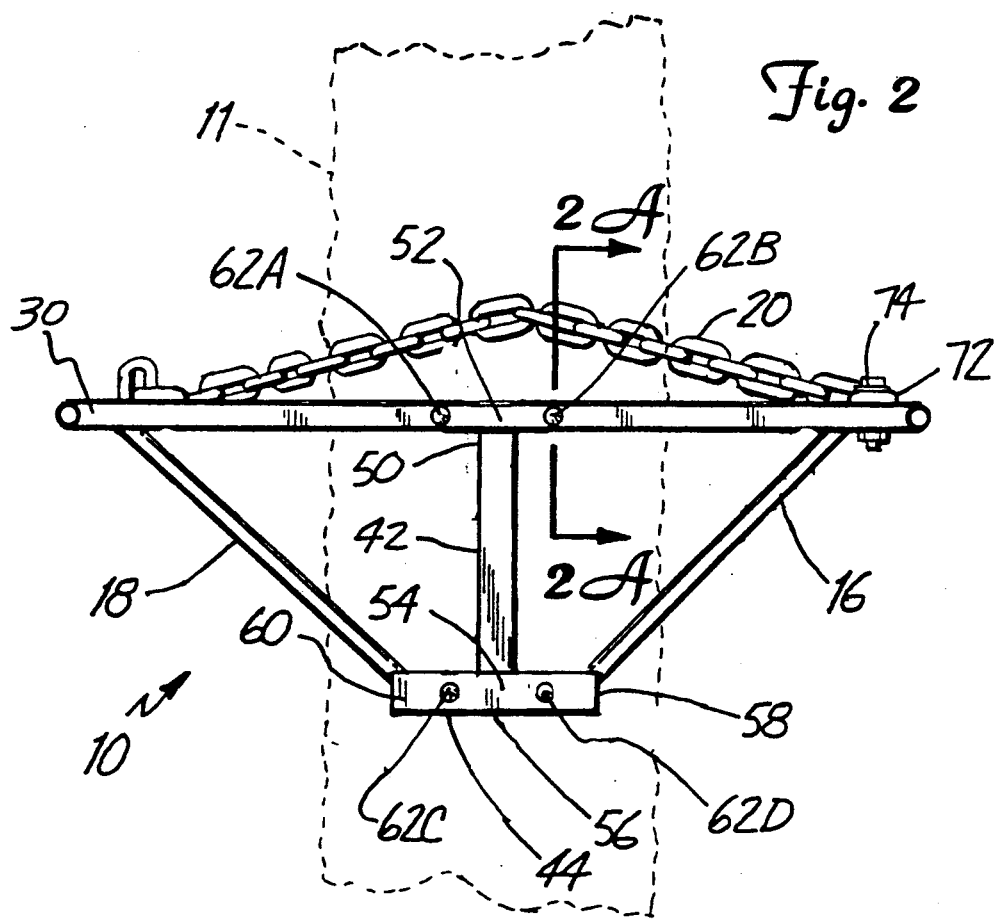
FIG. 2 is a rear view of the tree strand of FIG. 1.

FIG. 2 is a rear view of tree stand assembly 10 with tree 11 in phantom. As oriented in FIG. 2, top end 50 of vertical support member 42 is connected to rear side 30 at midpoint 52 of rear side 30. Vertical support member 42 extends vertically downward from and perpendicular to rear side 30. Horizontal support member 44 is generally parallel with rear side 30 and is connected to bottom end 54 of vertical support member 42 at midpoint 56 of horizontal support member 44. Vertical support member 42 and horizontal support member 44 are formed from square tubing of carbon steel similar to that used for rear side 30. The connections to rear side 30, vertical support member 42 and horizontal support member 44 are preferably made by welding. In one preferred embodiment, vertical support member 42 and horizontal support member 44 have a length of approximately 6 inches. Rear side 30, however, has a length of approximately 24 inches, which is generally identical to the lengths of left side 34, front side 32 and right side 36.

As further shown in FIG. 2, cantilevered beam 16 is connected to right side 58 of horizontal support member 44, and cantilevered beam 18 is connected to left side 60 of horizontal support member 44. Vertical mounting structure 14 and cantilevered beams 16 and 18 therefore provide effective support beneath platform 12 with an efficient use of materials.

To prevent relative vertical movement of tree stand assembly 10 and tree 11, tree stand assembly 10 is provided with a plurality of spurs 62A–62D on rear side 30 and horizontal support member 44. Spurs 62A and 62B of rear side 30 are generally vertically aligned with spurs 62C and 62D of horizontal support member 44. Each spur 62A–62D is generally spaced approximately 1 inch from midpoint 52 and 56, respectively.

As further shown in FIG. 2A, spur 62B includes head 64 and pointed end 66. Spur 62B is connected to rear side 30 by inserting spur 62B through predrilled holes (not shown) in rear side 30 so that pointed end 66 protrudes from rearward facing surface 68 of rear side 30 about 1 inch to about 3 inches. Head 64 of spur 62B, which is larger than the predrilled hole, is thereafter welded to frontward facing surface 70 of rear side 30 to securely connect spur 62B to rear side 30. Spur 62A is similarly connected to rear side 30, and spurs 62C–62D are similarly connected to horizontal member 44. The horizontal spacings of spurs 62A–62B and 62C–62D, respectively, ensures that tree stand assembly 10 can be securely mounted on trees having a relatively narrow diameter.

As further shown in FIGS. 2 and 2B, in one preferred embodiment, end 72 of link chain 20 is securely attached to rear side 30 by nut and bolt assembly 74. As shown in FIG. 2B, bolt 76 is passed through washer 78, link 80 and predrilled hole 82 in rear side 30. Nut 84 is thereafter threaded onto bolt 76 and tightened to secure chain 20 against rear side 30.

Figure 3:
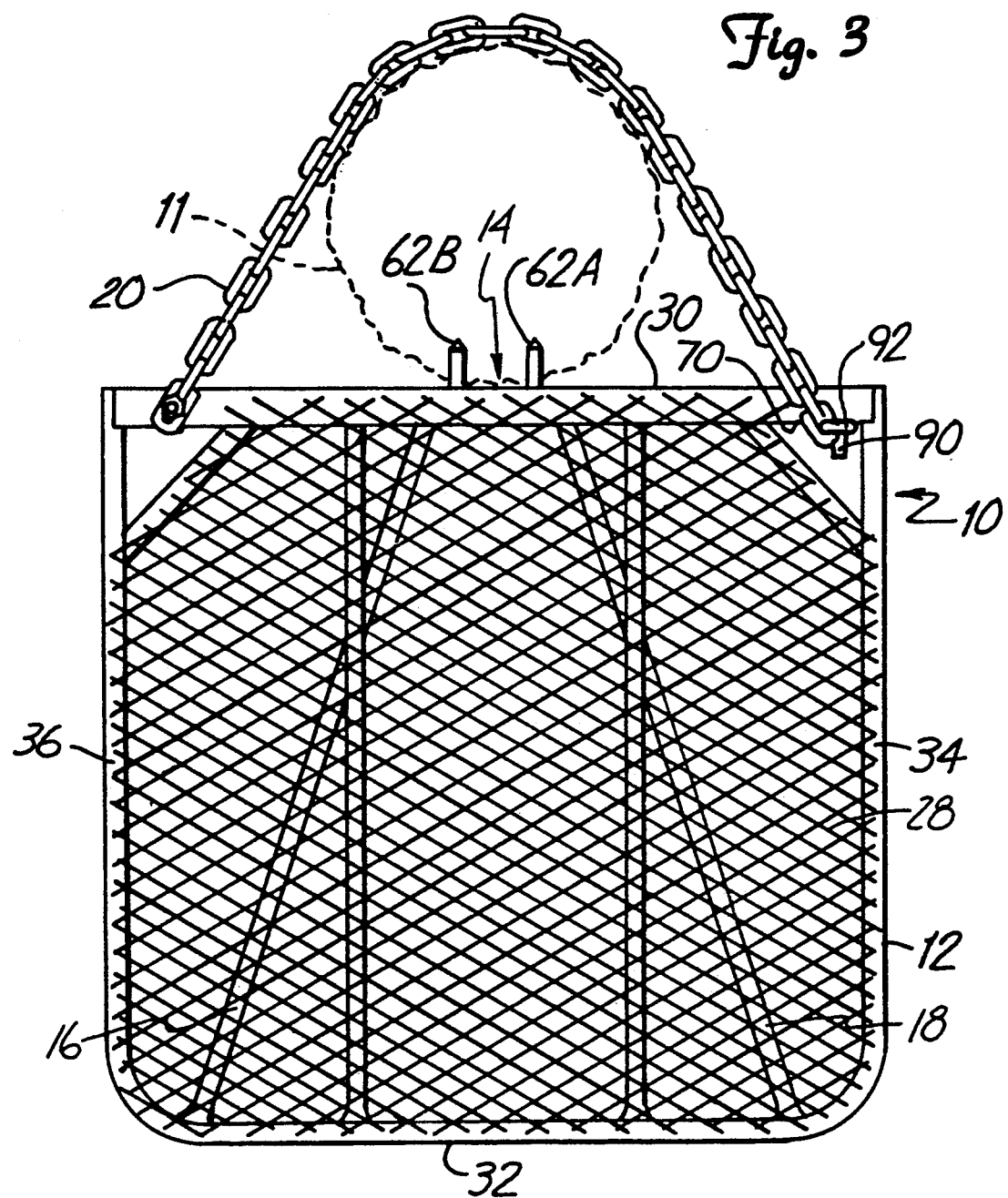
FIG. 3 is a top view of the tree stand of FIG. 1.

FIG. 3 is a top view of tree stand assembly 10 showing tree stand assembly 10 mounted to tree 11 (in phantom). Rear side 30 includes post 90 on frontward facing surface 70. Post 90, which is secured to rear side 30 in a manner similar to spurs 62A–62D, permits connection of chain 20 near left side 34. With chain 20 snugly wrapped around tree 11, end link 92 of chain 20 is placed over post 90 to hold platform 12 against tree 11. With chain 20 so secured around tree 11, a force of a weight applied to platform 12 is transmitted via cantilevered beams 16 and 18 to vertical mounting structure 14, which in turn drives spurs 62A–62D at into tree 11 a sufficient distance to prevent vertical and lateral movement of tree stand assembly 10 relative to tree 11.

Figure 4:
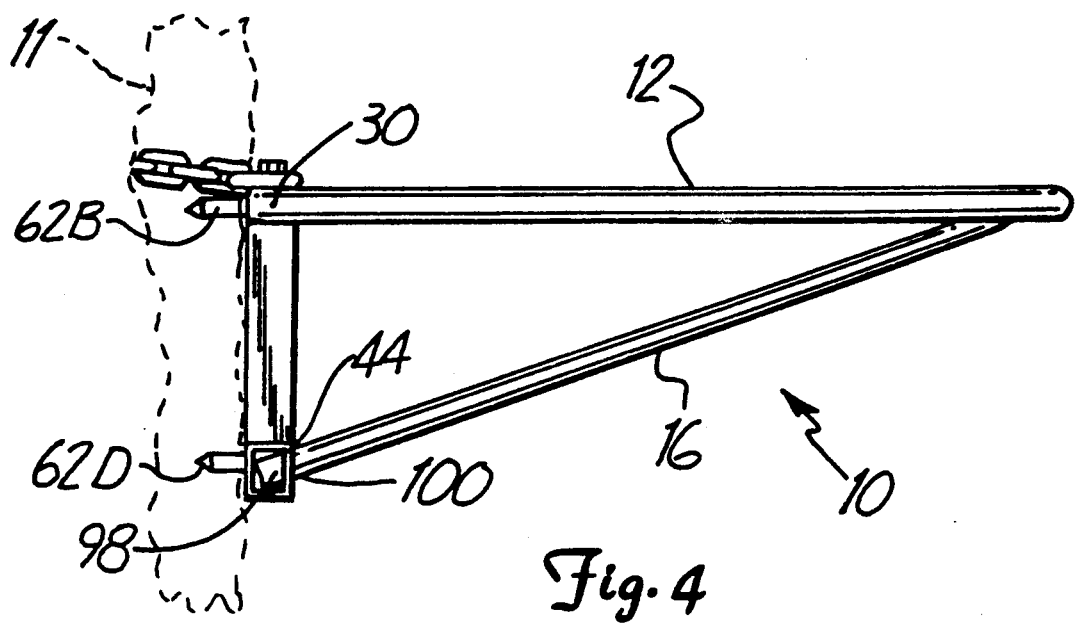
FIG. 4 is a side view of the tree stand of FIG. 1, mounted to a tree shown in phantom.

FIG. 4 is a side view of tree stand assembly 10. End 98 of cantilevered beam 16 is located within horizontal support member 44. End 98 passes through a hole (not shown) in frontward facing surface 100 of horizontal support member 44. Cantilevered beam 16 is further secured to horizontal support member 44 by welding. In this manner, stress applied to the connection of cantilevered beam 16 and horizontal support member 44 is born by the carbon steel tubing forming cantilevered beam 16 and horizontal support member 44, rather than by a simple weld joint between cantilevered beam 16 and horizontal support member 44. Platform 12 is therefore very stable and capable of readily supporting the weight of even a very large occupant.

FIG. 4 also shows that horizontal platform 12 is rotatable about an axis defined generally by rear side 30. Thus, with link chain 20 secured around tree 11, a downward force applied to platform 12 causes spurs 62A–62D to be at least partially driven into tree 11, thereby securely fixing tree stand assembly 10 at a desired location of tree 11.

Figure 5:
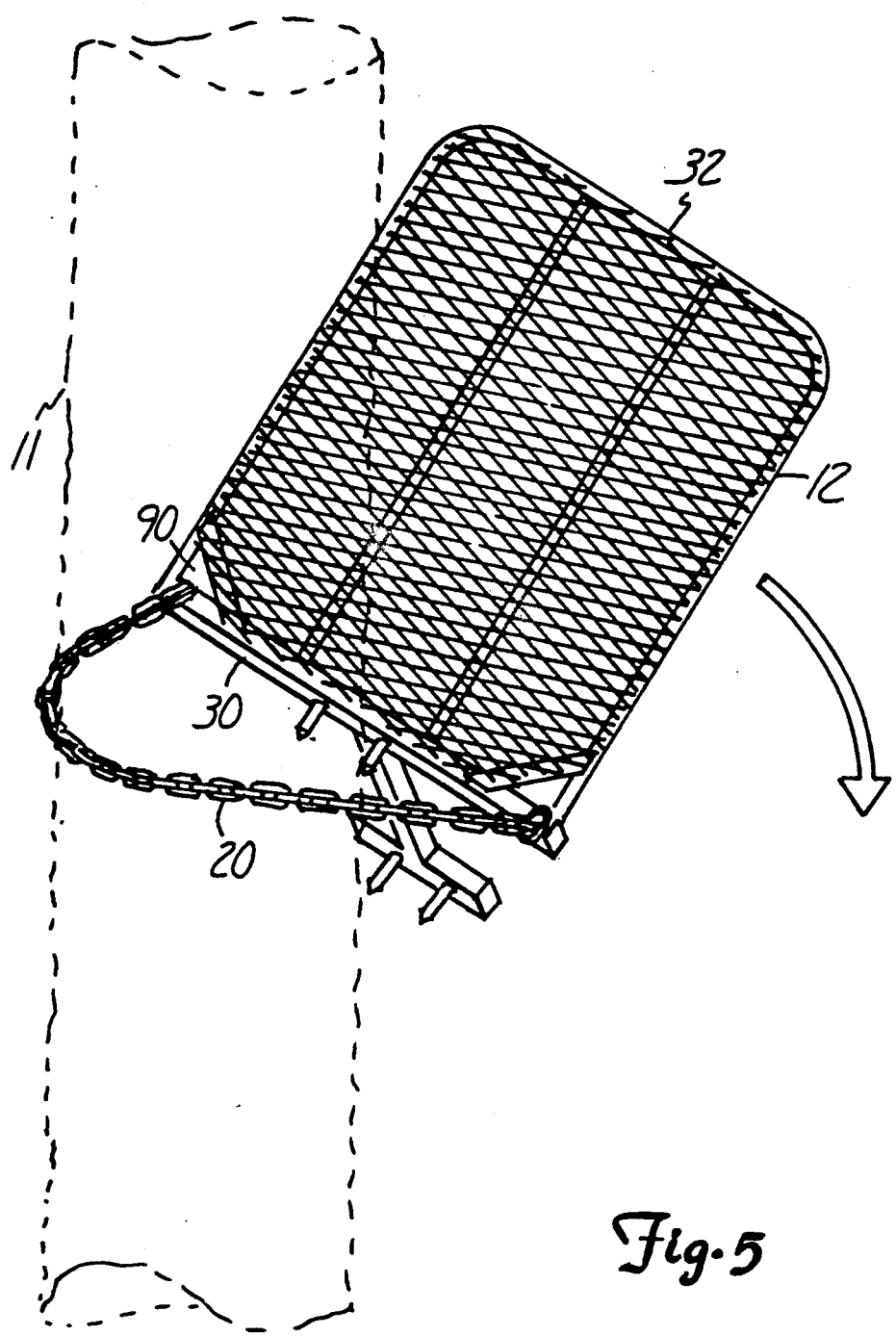
FIG. 5 is a rear perspective view of the tree stand assembly of FIG. 1 to demonstrate connection of the tree stand assembly to a tree.

FIGS. 4-5 demonstrate the simplicity with which tree stand assembly 10 is mounted to a tree. As shown in FIG. 5, platform 12 of tree stand assembly 10 is placed adjacent to tree 11 with rear side 30 located at a desired height above the ground and front side 32 oriented upwardly. Chain 20 is then passed around tree 11 and attached to post 90 as described earlier with respect to FIG. 2. Once chain 20 has been securely attached, front side 32 of platform 12 is rotated about an axis generally defined by rear side 30 until platform 12 is generally perpendicular to tree 11, as shown in FIG. 4. Rotation of platform 12 away from tree 11 drives spurs 62A–62D into tree 11, which securely fixes tree stand assembly 10 to tree 11. As demonstrated by this method, no additional cinching or tightening of chain 20 is required to securely fix tree stand assembly 10 to tree 11. The method just described is therefore a quick, easy and reliable method for securely attaching tree stand assembly 10 to tree 11.

Figure 6:
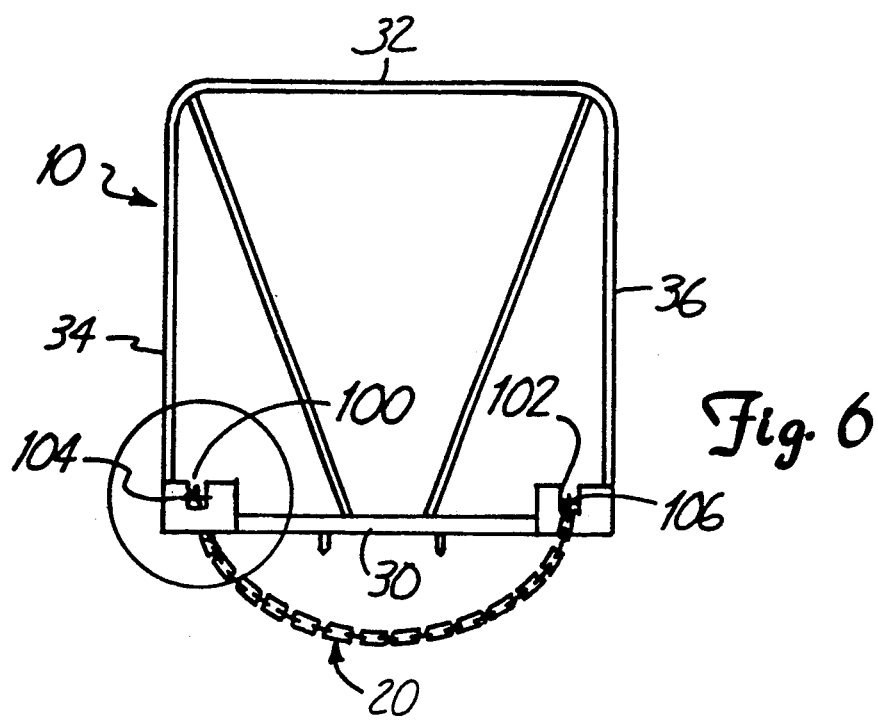
FIG. 6 is a top view of a second embodiment of the tree stand assembly of the present invention.

FIG. 6 is a top view of a second embodiment of the tree stand assembly 10. Platform 12 includes U-shaped brackets 100 and 102. U-shaped brackets 100 and 102 are preferably formed from a plate of metal, such as carbon steel. U-shaped bracket 100 is welded to rear side 30 and left side 34 with U-shaped opening 104 oriented towards front side 32. Likewise, U-shaped bracket 102 is welded to rear side 30 and right side 36 with U-shaped opening 106 oriented toward front side 32. U-shaped brackets 100 and 102 therefore replace corner supports 26 (shown in FIG. 1) and provide support for the connection of left side 34 and right side 36 to rear side 30. In addition, U-shaped brackets 100 and 102 are capable of capturing a link of chain 20 to secure tree stand assembly 10 to a tree. In this manner, chain 20 need not be permanently mounted to tree stand assembly 10.

Figure 6A:
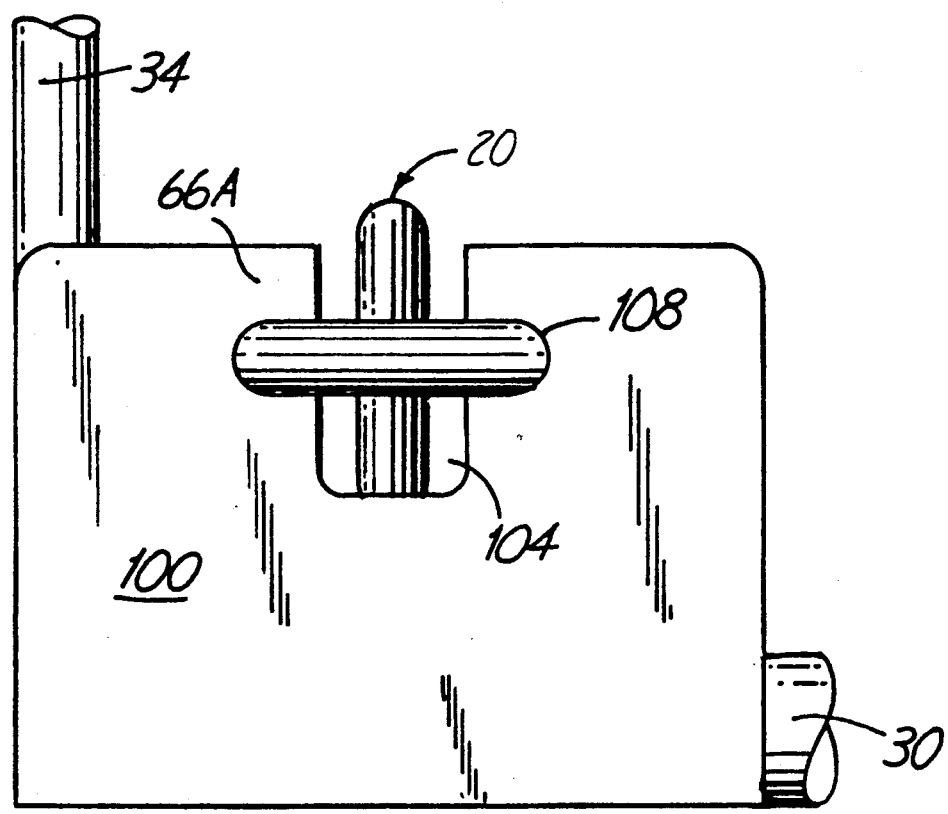
FIG. 6A is an enlarged view of a U-shaped bracket of FIG. 6.

FIG. 6A is an enlarged top view of U-shaped bracket 100. As shown is FIG. 6A, chain 20 is captured within U-shaped bracket 100 by placing link 108 within U-shaped opening 104. Because U-shaped opening 104 has a width less than a length of link 108, chain 20 can releasably secured tree stand assembly 10.

Figure 7A:
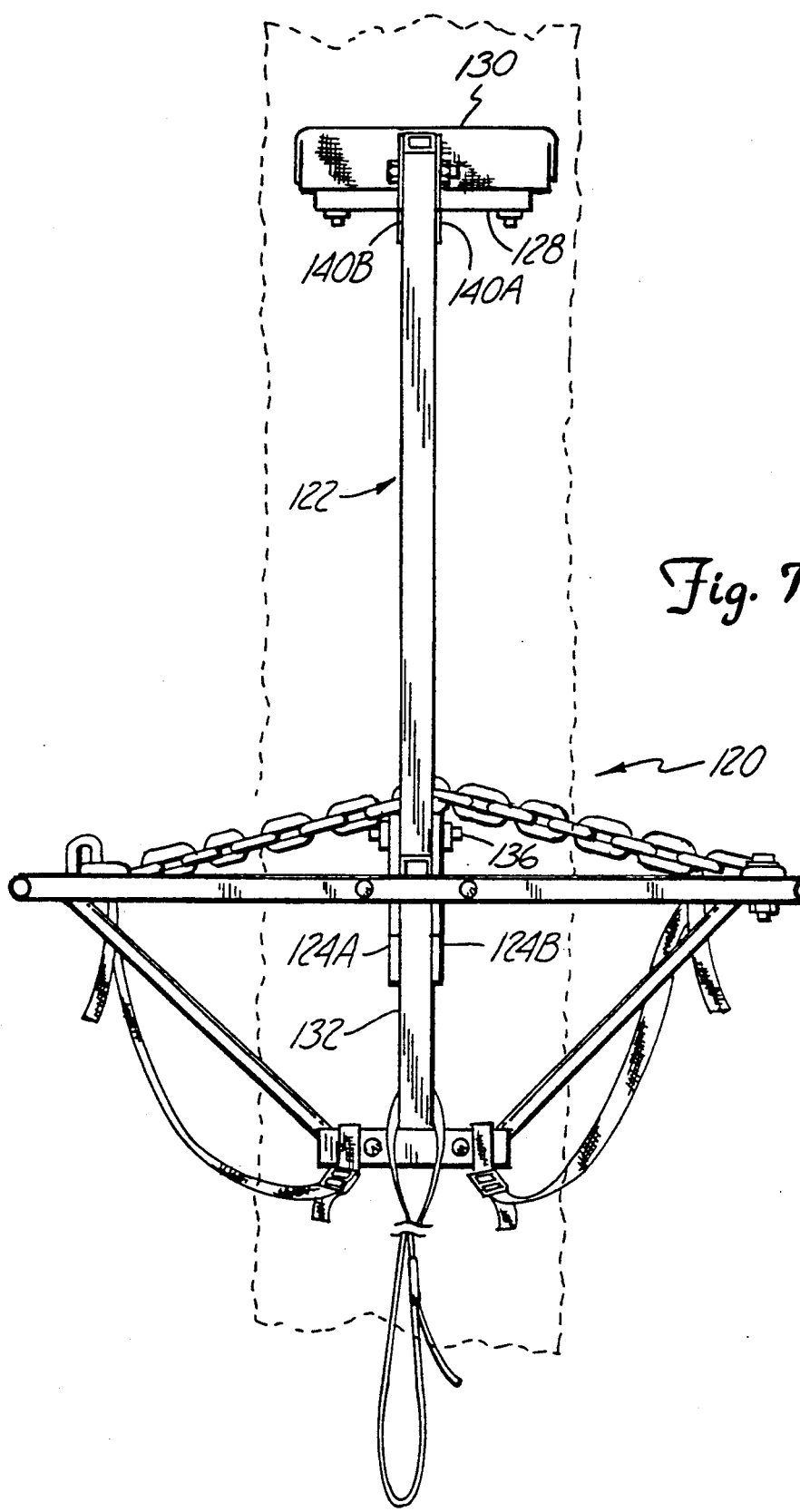
FIG. 7A is a rear view of the tree stand assembly of FIG. 7.

FIG. 7 is a side view of a third embodiment of tree stand 120 of the present invention. Tree stand assembly 120 includes seat assembly 122. Seat assembly 122 generally includes mounting bracket 124, support member 126, seat support 128 and seat cushion 130. Support bracket 124 is connected to vertical support member 132 and projects upwardly above platform 134 (and the floor) at approximately a 45° angle. Mounting bracket 124 is preferably formed by welding metal strips 124A, 124B to vertical support member 132 as shown in FIG. 7A.

Support member 126 is pivotally connected to mounting bracket 124 by bolt assembly 136. Support member 126 is preferably a length of square carbon steel tubing similar to that used for vertical support member 132. In a preferred embodiment, support member 126 has a length of approximately 24 inches.

Seat support 128 is pivotally connected to support member 126 by bolt assembly 138. Seat support assembly 128 generally includes mounting portion 140 and T-shaped support 142. As shown in FIGS. 7-7B, mounting portion 140 generally includes metal strips 140A and 140B which, like mounting bracket 124, are formed from metal strips such as carbon steel. Mounting portion 140 is welded to T-shaped support 142 such that when support member 126 is resting against tree 144 (shown in phantom), T-shaped support 142 and seat cushion 130 are generally parallel to platform 134. As shown in FIG. 7B, T-shaped seat support 142 is generally formed by central support member 141 and cross support member 143. Central support member 141 and cross support member 143 are formed from sections of square carbon steel tubing which are welded together to form T-shaped support 142. Seat cushion 130 is connected to T-shaped support member 142 by bolts 146, 148 and 150.

FIG. 7 further shows that seat assembly 122 can be folded against platform 134 for ease of transporting tree stand assembly 120, such as by carrying straps 152, and f or ease of mounting tree stand assembly 120 to a tree. Once mounted, support member 126 and seat support member 128 can be readily pivoted away from platform 134 with support member 126 resting against a tree and seat cushion 130 exposed for use.

The tree stand assembly of the present invention is lightweight, portable and easily mounted to a tree without the need for cinching or tightening the connecting chain once it has been wrapped around a tree. With the chain snugly wrapped around the tree and connected to the tree stand of the present invention, the user's weight on platform 12 is sufficient to force spurs 62 at least partially into a tree. The orientation of the spurs relatively close to the center line of the tree stand assembly permits the tree stand assembly of the present invention to be sturdily mounted on relatively narrow trees. The tree assembly of the present invention provides a stable and unobstructed platform on which a user may sit or stand. The tree stand assembly of the present invention is also easily and readily detachable from a tree and can be transported and easily reattached to suit the needs of the user.

Although the present invention has been described with reference to preferred embodiments, workers skilled in the art will recognize that changes may be made in form and detail without departing from the spirit and scope of the invention.

What is claimed is:

1. A tree stand assembly capable of supporting a person on a trunk of a tree, the tree stand comprising:
   a platform having a rear side which is positionable adjacent to the tree trunk, a front side opposite the rear side, a left side and a right side connecting the front and rear sides, and a supporting surface;
   securing means for securing the platform to the tree trunk, the securing means comprising:
      a support structure comprising a first support member having a first end connected to the rear side of the platform, a second end and a length of about six inches, the first support member extending transversely from the rear side of the platform in a direction opposite the supporting surface; and a second support member, transverse to the first support member, the second support member having a middle region connected to the second end of the first support member and a length approximating that of the first support member;
      a plurality of spurs extending rearwardly from the rear side of the platform and the support structure; and
      connection means capable of encircling the tree trunk and being connectable to the platform for holding the platform against the trunk of the tree; and
   a plurality of cantilevered support members, each cantilevered support member having a first end and a second end, the first end of each cantilevered support member being connected to the front side of the platform, the second end of each cantilevered support member being connected to the support structure.

2. The tree stand assembly of claim 1 wherein at least two spurs are positioned on the rear side of the platform and at least two spurs are positioned on the support structure.

3. The tree stand assembly of claim 2 wherein each spur extends at least about 1 inch from the rear side of the platform and the support structure.

4. The tree stand assembly of claim 3 wherein at least two spurs are positioned on the second support member.

5. The tree stand assembly of claim 3 wherein each spur is located about 1 inch from a midpoint of the first support member.

6. The tree stand assembly of claim 5 wherein the plurality of spurs are equally spaced from the first support member.

7. The tree stand assembly of claim 1 wherein the connection means comprises a link chain having a first link and a second link, the first link being connectable to the platform near the right side of the platform, and the second link being connectable to the platform near the left side of the platform.

8. The tree stand assembly of claim 7 wherein the first and second links of the chain are reversibly connectable to the platform.

9. The tree stand assembly of claim 1 and further including a collapsible seat assembly.

* * * * *

UNITED STATES PATENT AND TRADEMARK OFFICE
CERTIFICATE OF CORRECTION

PATENT NO. : 5,316,105

DATED : May 31, 1994

INVENTOR(S) : ROBERT F. REGGIN, MICHAEL F. ZAMZOW

It is certified that error appears in the above-indentified patent and that said Letters Patent is hereby corrected as shown below:

Col. 2, lines 64-65, delete "supports 2 6", insert --supports 26--

Col. 5, line 58, delete "f or", insert --for--

Signed and Sealed this

Twenty-second Day of November, 1994

Attest:

BRUCE LEHMAN

Attesting Officer

Commissioner of Patents and Trademarks